C. A. WHEDON.
AUTOMATIC WEIGHING-SCALES.
No. 181,228.  Patented Aug. 15, 1876.
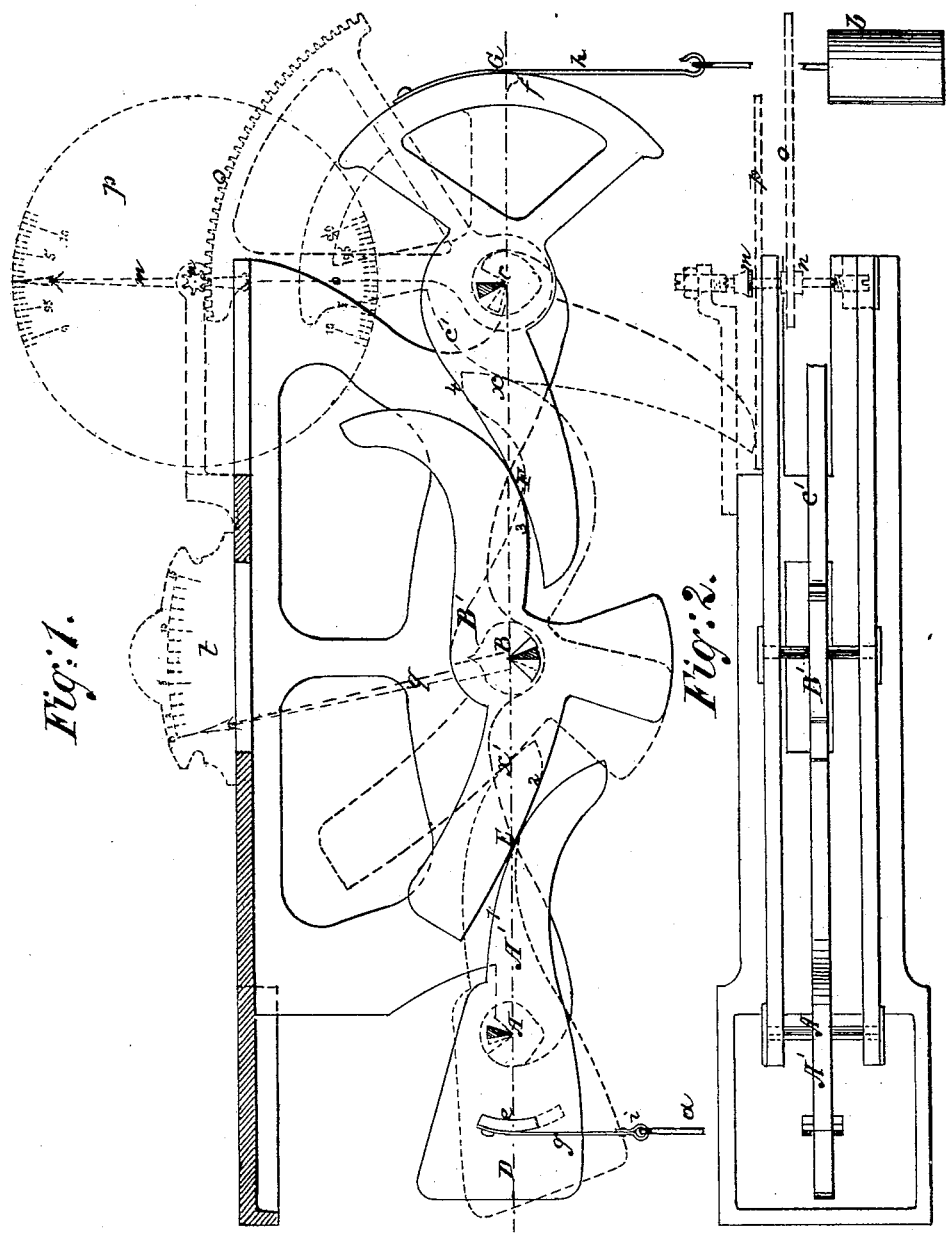

UNITED STATES PATENT OFFICE.

CHARLES A. WHEDON, OF CRANFORD, NEW JERSEY.

IMPROVEMENT IN AUTOMATIC WEIGHING-SCALES.

Specification forming part of Letters Patent No. 181,228, dated August 15, 1876; application filed July 15, 1876.

*To all whom it may concern:*

Be it known that I, CHARLES AUSTIN WHEDON, of Cranford, in the county of Union and State of New Jersey, have invented a new and Improved Automatic Weighing-Scale, of which the following is a specification:

My invention consists of a system of three levers, in rolling contact with each other, revolving about fixed centers, the surfaces of contact being curved in such a manner that the third lever shall always describe arcs proportional to the weights applied to the first lever, the whole acting by the force of gravity only. The fixed centers are made equidistant from each other, the points of support being knife-edges, attached to each lever, one on either side, in the usual manner. Each lever, as a whole, is so proportioned that its center of gravity coincides with the knife-edge or center of motion. The levers, therefore, have no tendency in themselves to rotate. This is a condition necessary to the success of the machine; otherwise it would be impossible to obtain movements of the lever proportional to the weight, which is of importance in connection with the recording of the weights by the pointer and dial.

The conditions for rolling contact are that the point of contact shall be on the right line joining the centers of motion, and that the rolling-curves shall have a common tangent at that point. There are two points of contact in this case, the middle lever touching both the first and third levers; and the condition is assumed that these two points of contact shall preserve an invariable distance between them, which distance shall be equal to the distance between the fixed centers. A counterpoise, attached to the third lever, is so adjusted for weight that the points of contact of the levers shall be midway between the points of support when the system is unloaded—that is, when there is no load on the platform—the system being at the same time in equilibrium.

Both the first and third levers are provided with arcs of circles, drawn from the knife-edges, as centers from which arcs the weights are suspended, so as to preserve an invariable lever-arm for all positions of the levers.

In the accompanying drawing, Figure 1 is a side elevation of my improved scale, except the platform, and Fig. 2 is a plan of the same inverted.

Let A, B, and C be the centers of the three levers A', B', and C', respectively. The rod $a$, connecting with the platform, is suspended from the first lever on the arc drawn with the radius A D. The counterpoise $b$ is suspended from the third lever on the arc drawn within a radius, C G. When in equilibrium, without load, the points of contact are at E and F, respectively, midway between A B and B C. For any load placed on the platform the points of contact move equal distances along A C to some points X and X' at the same time that the curved surfaces roll on each other, and the levers revolve through certain arcs, the rotation of the third lever C' being proportional to the weight placed on the platform.

In order to secure these results the rolling-surfaces must be conformed to certain special curves, of which the following are the formulæ, each curve having its origin at the center of motion of the lever to which it applies. Thus, A is the origin of the first curve; B is the origin of the second and third curves; C is the origin of the fourth curve. Let P be the radius vector of the first curve; $r'$ be the radius vector of the second curve; $r$ be the radius vector of the third curve; $\rho$ be the radius vector of the fourth curve. Let $x$ be the variable angle of the first curve; B be the variable angle of the second and third; $\theta$ be the variable angle of the fourth; all estimated from line A C, and positive in the direction of the motion of the hands of a watch. Let $2a =$ the distance A B = B C. Let M = the modulus of the common systems of logarithms, or $\frac{1}{2}$ M = 2—302585.

The following are then the formulæ:

First curve $X = \dfrac{k}{2M} \log \dfrac{\rho'}{2a-P}$

Second curve $B = \dfrac{-k(a-r')}{r'}$

Third curve $B = \dfrac{-k(r-a)}{2a-r}$

Fourth curve $\theta = \dfrac{ka(a-P)}{\rho 2}$

In these formulæ $k$ is an arbitrary constant, depending on the size and capacity of the scales to which the system is to be attached. The curves for scales of different sizes may be plotted from the formulæ by any method found convenient; but to facilitate their construction tables may be computed for the purpose.

The product of the radius vectors and corresponding arc is the length of the circular arc described by the radius vectors, intercepted between the lines A C and the required curve.

For example: In a scale with levers adapted to No. 9, drop-lever platform-scales (Fairbank's) capacity one thousand five hundred pounds, the value of $k$ is taken at $\frac{16}{30}$, by which the tabular values of the circular ordinates must be multiplied; or, the distances from the origin of each curve may be plotted by a scale of sixteenths, and the circular ordinates by a scale of thirtieths without multiplication.

The knife-edges are so placed on the beams that they shall cover the resultant pressures for all positions of the beams.

The curves are adjusted for perfectly equable motion of the right-hand lever $c'$, and therefore I have introduced arcs $ef$ for the end weights, on which pieces of clock-spring $g$ $h$ will rest, supporting the weights. On A' the arcs project each side of the beam, like the knife-edges, and there will be two pieces of spring supporting a short steel bolt, $i$, on which the rod hangs. The black lines show the position of the combined levers when the platform is unloaded. The dotted lines show the position for a load of one thousand five hundred pounds in a scale of the proportions above indicated. The counterpoise should be just sufficient to bring the point of contact of the levers to the middle or zero point for the unloaded platform.

All the adjustment of the machine must be in the weight of the counterpoise. For recording the weights there may be a pointer, $m$, geared by a pinion, $n$, with a segment, O, attached to the lever $c'$, or otherwise connected with it, to work in connection with dial $p$, and there may also be a pointer, $q$, connected to the middle lever, in connection with another dial, $t$, the said dials being appropriately graduated; but any other approved arrangement of recording apparatus may be employed.

It will be noted that the middle lever is supported by the first and third levers, and held in its place by them, and the resultant pressure of these two levers is always in a vertical line.

Having thus described my invention, what I claim, and desire to secure by Letters Patent, is—

1. A combination of curved levers for weighing purposes, consisting of a middle lever having two curves, and two levers having one curve each, and being in rolling contact with the curves of the middle lever, respectively, the points of contact being in the line of the axes of the levers, and the curves being such that the two points of contact preserve an invariable distance between them, which distance equals the fixed distance between the centers, substantially as specified.

2. The combination of three levers revolving about fixed centers, with which their centers of gravity coincide, in rolling contact with each other, and moving the third lever in arcs proportional to the weights applied to the first lever, substantially as specified.

CHARLES AUSTIN WHEDON.

Witnesses:
 F. A. THAYER,
 WM. MORGAN.